United States Patent [19]

Irwin

[11] Patent Number: 4,640,972

[45] Date of Patent: Feb. 3, 1987

[54] FILAMENT OF POLYIMIDE FROM PYROMELLITIC ACID DIANHYDRIDE AND 3,4'-OXYDIANILINE

[75] Inventor: Robert S. Irwin, Wilmington, Del.

[73] Assignee: E. I. Du Pont de Nemours and Company, Wilmington, Del.

[21] Appl. No.: 798,512

[22] Filed: Nov. 15, 1985

[51] Int. Cl.$^4$ .............................................. C08G 73/10
[52] U.S. Cl. .................................. 528/188; 528/184; 528/327; 528/329.1; 528/331; 528/353
[58] Field of Search ........................ 528/188, 353, 184

[56] References Cited

U.S. PATENT DOCUMENTS

| | | | |
|---|---|---|---|
| 3,415,782 | 12/1968 | Irwin et al. | 528/188 |
| 4,290,936 | 9/1981 | Sasaki et al. | 260/33.4 |
| 4,311,615 | 1/1982 | Frosch et al. | 252/514 |
| 4,358,581 | 11/1982 | Sutton, Jr. | 528/188 |
| 4,376,195 | 3/1983 | Lee | 528/188 |
| 4,438,256 | 3/1984 | Ohta et al. | 528/188 |
| 4,454,276 | 6/1984 | Uda et al. | 528/188 |
| 4,524,171 | 6/1985 | Bakshi et al. | 528/188 |

FOREIGN PATENT DOCUMENTS 2025311B 8/1982 United Kingdom .

*Primary Examiner*—Harold D. Anderson

[57] ABSTRACT

Polypyromellitimide filaments having high strength and high modulus are obtained by dry-spinning a solution of polyamide-acid of polypyromellitic dianhydride, 3,4'-oxydianiline and paraphenylenediamine, substituted derivatives thereof or 4,4'-diaminobiphenyl or 4,4'-diaminobenzanilide, then converting the polyamide-acid to the polyimide and drawing.

5 Claims, No Drawings

FILAMENT OF POLYIMIDE FROM PYROMELLITIC ACID DIANHYDRIDE AND 3,4'-OXYDIANILINE

BACKGROUND OF THE INVENTION

This invention relates to certain high strength and high modulus polypyromellitimide filaments and to a method of obtaining them. Aromatic polyimides, and particularly polypyromellitimides, are well known for their high temperature physical and chemical stability. Certain polyimides or modified polyimides have been commercialized as high temperature fibers but their tenacity or modulus are inadequate for reinforcement purposes.

U.S. Pat. No. 3,415,782 discloses a process whereby a polyamide-acid is formed into a shaped article and the article then treated to convert the polyamide-acid polymer to the polyimide thereof. The polyimide polymers described therein were prepared from pyromellitic dianhydride and bis(4-aminophenyl)ether or bis(4-aminophenyl)sulfide.

In the case of filaments comprising polyimide polymers of the aforementioned U.S. Pat. No. 3,415,782, it has been found that in some applications these filaments have insufficiently high modulus for applications in plastics reinforcement where carbon, glass and Kevlar ® aramid fibers are currently used.

SUMMARY OF THE INVENTION

The filaments of this invention consist essentially of a polyimide of recurring units of the formula

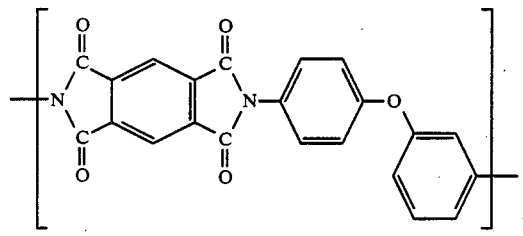

A.

with from 0 to 60 mol %, preferably from 20 to 30 mol %, of units of the formula

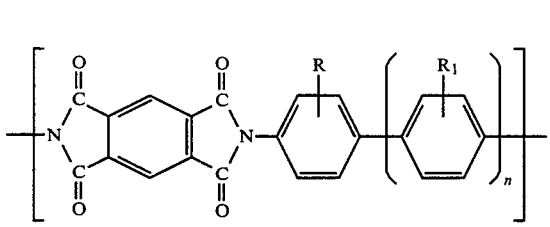

B.

or

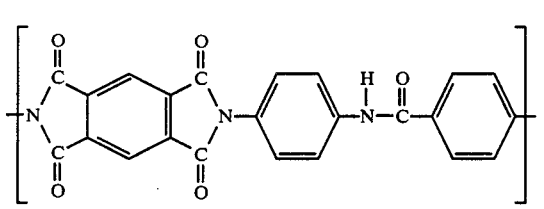

C.

where n is 0 or 1; R and $R_1$ which may be the same or different are selected from halogen, lower alkoxy, hydrogen or lower alkyl. Filaments of the invention typically exhibit a tenacity of at least about 10 g./d., and a modulus of at least about 250 g./d. Filaments of the copolymers, particularly where 20 to 30 mol % of units of formula B are present, typically exhibit tenacities in excess of 12 g./d. and moduli in excess of 350 g./d.

DESCRIPTION OF THE PREFERRED EMBODIMENTS

In a preferred embodiment of the process of this invention pyromellitic dianhydride is first reacted with 3,4'-oxydianiline or a mixture thereof with paraphenylene diamine in an organic solvent under anhydrous conditions while maintaining the temperature throughout the reaction below 50° C., advantageously below 30° C. In place of the paraphenylene diamine which is preferred, there may be employed the halogen (preferably chloro-), lower alkyl (i.e., 1–4 carbon alkyl), or lower alkoxy (i.e., 1–4 carbon alkoxy), substituted derivatives thereof or 4,4'-diaminobiphenyl. There is thus provided a spinning solution of an amide-acid polymer of fiber forming molecular weight, having the formula

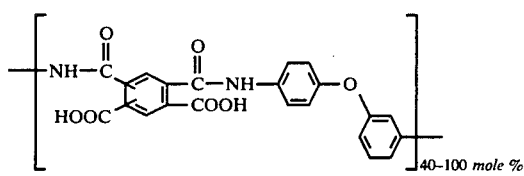

and

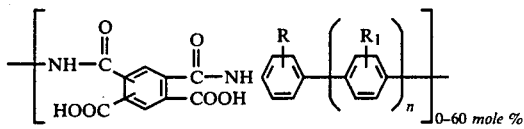

where R, $R_1$ and n have the previously ascribed meanings.

The paraphenylenediamine may be replaced by 4,4'-diaminobenzanilide if desired yielding a polyamide-acid of the formula

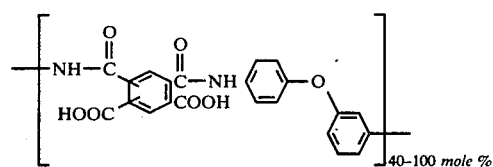

and

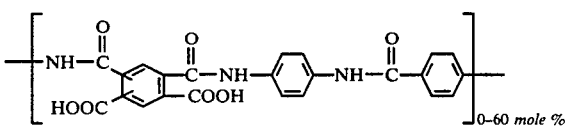

A highly suitable process for the preparation of spinning solutions of the above amide-acid polymers involves addition of about 0.97 equivalent of solid pyromellitic dianhydride to a solution of about 1.0 equivalent of one or both of the appropriate diamines dissolved in an organic solvent. The contents of the reaction vessel are desirably kept below 50° C., preferably below 30° C. at all times during the addition by externally cooling the contents so as to remove the evolved heat of polymerization. The resulting polymer solution is then adjusted to a suitable solution viscosity by incremental addition of a solution or slurry of pyromellitic dianhydride in the organic solvent. Reagents and solutions should be essentially anhydrous because of the detrimental effect of water upon the polymerization process, and at all times should be kept under nitrogen to exclude moisture. For the same reason the reaction vessel should be also flushed with nitrogen prior to dissolution of the diamine in the solvent.

While many organic solvents are useful for preparing amide-acid polymers in solution form, those found especially suitable for use in the process of the invention for the preparation of polymer solutions and for the direct dry spinning of strong filaments therefrom are dimethylformamide, N,N-dimethylacetamide, pyridine, and mixtures of pyridine with either of the other two solvents. A mixture of N,N-dimethylacetamide-pyridine is the preferred solvent in most cases.

Polyamide-acid spinning solutions containing from 10 to 26% or greater by weight solids can be employed in the process of the invention although spinning solutions of about 20% solids content are particularly well suited. Solution viscosity is an important factor in preparing tough polyimide fibers by the process of this invention. For example, in the spinning of dimethylacetamide solution of the polyamide-acid it has been found that suitable filaments can be dry spun from solutions wherein the solution viscosity varies between 800 and 1000 poises and preferably 1500–5000 poises at 30° C. The solution viscosity, as measured in poise units with a Brookfield viscometer, increases sharply as equivalence is approached and in accordance with the preferred process of preparing these solutions, final additions of the pyromellitic dianhydride solution or slurry must be made with care. Solution viscosity drops as the equivalence point is exceeded. It is, therefore, important for the stability of the polymer to avoid using an excess of pyromellitic dianhydride in preparing the spinning solutions.

When the desired solution viscosity has been attained, the preferred polyamide-acid spinning solution in the N,N-dimethylacetamide-pyridine mixture (which preferably is not handled for prolonged periods of time at temperatures above 60° C. prior to spinning) is extruded through a spinneret into a heated spinning column which is continuously being swept by a steady co-current flow of dry gas, e.g. nitrogen. Normally the gas temperature will be well below 200° C., usually 100°–150° C. for a low number of filaments. Spinning conditions should be adjusted so that the freshly spun filaments contain about 20% to about 35%, preferably about 20% to 30% of the spinning solvent based on the total weight of the filament. The filaments may be withdrawn from the spinning column at a rate of about 100–200 yds./min. and may then be treated, after they emerge from the spinning chamber, with water or a composition relatively free of metal salts and preferably volatile under imidization conditions.

The subsequent steps of the process for obtaining the strong, thermally stable polyimide fibers from the as-spun filaments need not be carried out in a fixed sequence, since several variations are possible wihin the scope of the invention. As previously noted, these post spinning steps involve complete conversion of the as-spun filaments to the polyimide species and filament drawing at elevated temperatures.

Conversion of the as-spun filaments to strong, thermally stable polyimide filaments by imidization of the polyamide-acid linkages in the polymer can be effected by thermal means. Filament drawing can be accomplished after the conversion process, i.e., after the as-spun filaments have been heat treated to form the imide. The filaments are ordinarily drawn at least $3\times$ at temperatures in the range of 450° C. to 700° C. Polymer composition, draw ratio and temperature are variables which must be taken into account when preparing the filaments of this invention. For example drawing the filaments of Example 3 below, $6\times$ at 550° C. results in fusion of the filaments.

The filaments of the invention may be of denier up to 10 denier per filament or more, and of various shapes. Typical uses for the filaments because of their excellent tensile properties include protective clothing and reinforcement for polymer matrix composites.

The filaments of the invention may be modified by typical additives such as pigments, finishes and the like. In some cases these may be advantageously provided in the filaments by inclusion directly in the spinning solution.

Fiber properties of tenacity, elongation, and initial modulus, are coded as T/E/Mi and are in conventional units of grams per denier (g/d), percent, and grams per denier (g/d), respectively.

The following examples will further illustrate the invention. It will be understood that these examples are deemed to be representative of this invention but do not constitute all of the runs performed and results obtained. Variations in results are believed to be due primarily to use of different draw temperatures and draw ratios and variability in fiber denier occasioned by the small-scale, experimental nature of the equipment.

EXAMPLE 1

This example illustrates the preparation of polyamide-acid filaments from a copolymer of pyromellitic dianhydride, 3,4'-oxydianiline and paraphenylenediamine, conversion to the imide and drawing at elevated temperatures. The mole ratio of the 3,4'-oxydianiline to the paraphenylenediamine used was 3:1, hence 75 mol % of unit A (as previously described) is present in the copolymer and 25 mol % of unit B (as previously described) is present.

Under anhydrous conditions 48 g. 3,4'-oxydianiline (0.24 mole) and 8.64 g paraphenylenediamine (0.08 mole) was dissolved in a mixture of 396 ml dry pyridine and 44 ml dry N,N'-dimethylacetamide. (The latter is necessary to prevent gelation of the spin dope.) To this solution, at room temperature, was added, all at once, 67.68 g. predried pyromellitic dianhydride (0.32 mole) with good stirring. When all of this had reacted (dissolved), a solution/slurry of 5 g. pyromellitic dianhydride/50 ml dimethylacetamide was added portionwise until the solution viscosity had built up to a level (estimated 3000–4000 poises) suitable for dry spinning.

This solution containing 22% polymer, was dry spun under the following conditions:

| | |
|---|---|
| Spinneret | 10 holes of 0.005 inch diameter |
| Pack | Screens |
| Solution temp. | 30° C. |
| Column temp. | 135° C. |
| Spinneret temp. | 60° C. |
| Gas temperature | 110° C. |

Operability was excellent. The as-spun fiber, without finish, was piddled into a perforated drum container and heat-treated: 20 min at 150° C.+20 min at 200° C.+30 min at 300° C. There was no fiber sticking. The fiber was backwound onto cones and drawn through an 18 inch hot tube in nitrogen at various temperatures and draw ratios as shown in Table I. The feed rate was about 5 ft/min. As-spun dpf was about 8 dpf.

TABLE I

| Temp. | Draw Ratio | AVERAGE T/E/Mi (g/d) | BEST BREAK T/E/Mi (g/d) |
|---|---|---|---|
| — | As-spun | 1.8/125/2 | 2.0/134/28 |
| 550° C. | 4X | 12.6/7.1/354 | 12.8/7.4/365 |
| 575 | 4.75X | 14.7/4.7/427 | 18.1/4.9/574 |
| 600 | 4.7X | 14.5/3.7/492 | 15.1/3.8/— |
| 650 | 6.0X | 12.8/2.8/519 | 14.1/3.3/555 |
| 675 | 6.1X | 15.6/3.3/570 | 18.7/4.0/717 |
| 700 | 6.8X | 13.1/3.0/592 | 13.6/3.6/635 |
| 700 | 10X | 15.5/3.4/534 | 16.2/3.6/561 |
| 750 | 5X | 3.6/3.7/168 | 4.0/4.1/172 |

EXAMPLE 2

For comparison with the foregoing copolyimide, the homopolymer was prepared by similar procedure as a 22% solution of the polyamide-acid in dimethylacetamide/pyridine (10/90). This was dry spun under similar conditions to the copolymer above and cycloimidized as a piddled package in the same way. Table II shows that the best tensile properties obtained from the homopolymer were below those of the copolymer. Whereas, the maximum drawability of the latter was almost 10X, the homopolymer was not drawable by more than 5X.

TABLE II

DRAWABILITY AND PROPERTIES OF HOMOPOLYMER

| Temp. | Draw Ratio | AVERAGE T/E/Mi | BEST BREAK T/E/Mi |
|---|---|---|---|
| 500° C. | 3.6X | 9.5/8.6/248 | 11.7/11.5/286 |
| 550 | 4.5 | 8.9/2.7/404 | 10.1/3.3/450 |
| 550 | 4.0 | 10.7/5.5/302 | 12.3/6.5/396 |
| 575 | 4.0 | 8.3/4.2/321 | 9.1/5.9/368 |

This example illustrates the preparation of a copolymer of pyromellitic dianhydride, 3,4'-oxydianiline and paraphenylenediamine. Filaments were spun therefrom, converted to the imide and then hot drawn.

Polymerization

A 21.7% solution of the polyamide-acid in pyridine-dimethylacetamide (72/28) was prepared by dissolving 19.2 g. 3,4'-oxydianiline (0.096 mole) and 6.92 g. paraphenylenediamine (0.064 mole) in a mixture of dry pyridine (154 ml) and dry dimethylacetamide (66 ml), i.e., a 72:28 weight ratio. At 10°-20° C., with external cooling as necessary and under a slow current of dry nitrogen to exclude atmospheric moisture, 32.0 g. pyromellitic dianhydride (0.147 mole; 92% of theoretical) was mixed in rapidly and quantitatively. The polymer solution was brought to a high bulk viscosity by portion-wise addition of a slurry/solution of 5.0 g. pyromellitic dianhydride (0.023 mole; 6.5% excess of stoichiometric amount) until the desired viscosity was reached.

Spinning and Heat-Treatment

This polymer solution as dry-spun by extuding it from a reservoir, in which it was held at 55° C., through a 10-hole spinneret with each hole 0.001 in. diameter, into a concurrent flow of nitrogen at 125° C. at a rate of 6.0 ft³/min, inside a column 6 in. diameter × 16 ft. long with walls heated uniformly at about 125° C. Fiber was wound up at 375 ft./min.

The yarn was piddled into a perforated metal basket which was heated, under nitrogen, in an oven at 150° C./20 min.+200° C./20 min.+300° C./30 min. At this point the filaments had T/E/Mi/dpf=1.60/136/36.8//7.18. The fibers were manually stretched −6× over a short hot-plate under nitrogen at 500° C. to give average T/E/Mi=12/3.2/472 and highest individual filament break of 15/3.6/557. At 550° C. and above, the fibers fused.

EXAMPLES 4-7

Copolyamide-acid solutions similar to those of Example 3 and containing the molar percentages of 3,4'-oxydianiline comonomer as shown in Table III, were prepared, spun, and heat-treated similarly to Example 3. The as-imidized fibers were single-stage drawn in a similar manner across a hot-plate, with approximately one inch contact distance at various temperatures between 450° C. and 600° C. Table III showed maximum draw ratios within this temperature range, the maximum average (of five or more breaks) tensile properties, and the best single break properties for each composition.

TABLE III

| Example | Mole % 3,4¹-oxydianiline | Max. Draw Ratio | Average T/E/Mi | Best Break T/E/Mi |
|---|---|---|---|---|
| 4 | 100 | 5X | 11/3/5.1/297 | 12.7/5.4/326 |
| 5 | 60 | 6X | 11.8/3.2/472 | 14.8/3.6/557 |
| 6 | 50 | 6X | 10.1/4.4/401 | 10.6/4.9/414 |
| 7 | 40 | 4X | 9.3/2.8/428 | 11.2/2.9/575 |
| — | 0 | 1.4X | | 2.6/3.3/118 |

The filaments had appreciable non-uniformity.

I claim:

1. A filament consisting essentially of a polyimide of recurring units of the formula

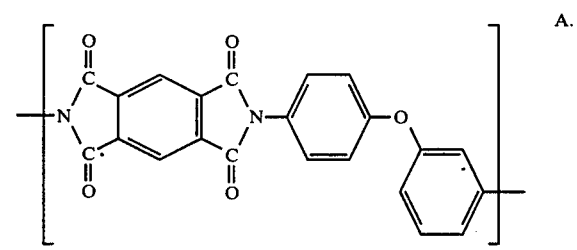

A.

with from 0 to 60 mole %, of units of the formula

B. 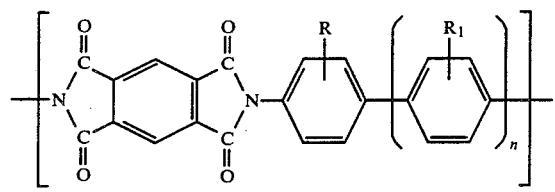

C. 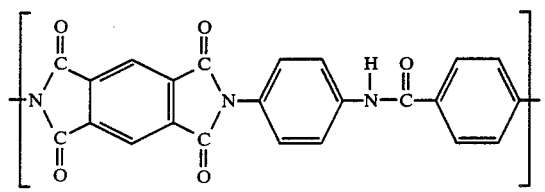

where n is 0 or 1: R and $R_1$, which may be the same or different are selected from halogen, lower alkoxy, hydrogen or lower alkyl.

2. A filament according to claim 1 wherein from 20 to 30 mole % of units of formula B is present in the polyimide.

3. A filament according to claim 1 consisting essentially of a polyimide of recurring units of the formula

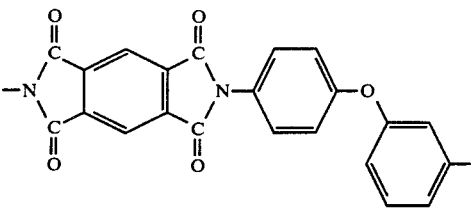

4. A polyamide-acid of fiber forming molecular weight, having the formula

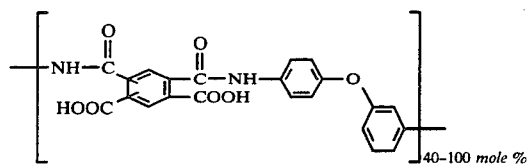
40–100 mole % and

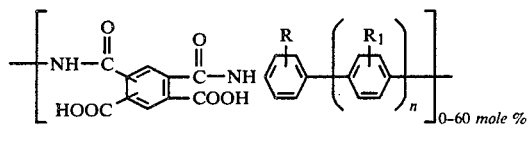
0–60 mole % or

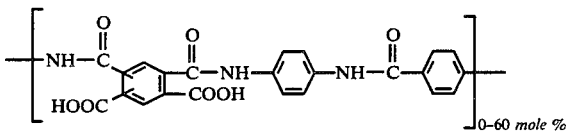
0–60 mole %

5. A polyamide-acid according to claim 4 consisting essentially of recurring units of the formula

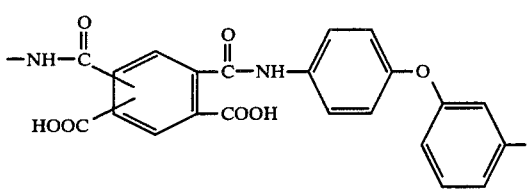

* * * * *